(12) United States Patent
Salomon et al.

(10) Patent No.: US 9,204,521 B2
(45) Date of Patent: Dec. 1, 2015

(54) ADAPTING TURN SIGNAL

(71) Applicants: Tavi Salomon, Holon (IL); Itzhak Pomerantz, Kefar Sava (IL)

(72) Inventors: Tavi Salomon, Holon (IL); Itzhak Pomerantz, Kefar Sava (IL)

(73) Assignee: Tavi Salomon, Holon (IL)

(*) Notice: Subject to any disclaimer, the term of this patent is extended or adjusted under 35 U.S.C. 154(b) by 0 days.

(21) Appl. No.: 14/600,236

(22) Filed: Jan. 20, 2015

(65) Prior Publication Data

US 2015/0208488 A1 Jul. 23, 2015

Related U.S. Application Data

(60) Provisional application No. 61/930,073, filed on Jan. 22, 2014.

(51) Int. Cl.
*G10H 7/00* (2006.01)
*H05B 37/02* (2006.01)
*B60Q 1/38* (2006.01)
*B60Q 9/00* (2006.01)

(52) U.S. Cl.
CPC .............. *H05B 37/0236* (2013.01); *B60Q 1/38* (2013.01); *B60Q 9/00* (2013.01)

(58) Field of Classification Search
CPC .............. B60Q 5/00; B60Q 1/34; B60Q 1/38; B60Q 9/00; H05B 37/236
See application file for complete search history.

(56) References Cited

U.S. PATENT DOCUMENTS

| 7,332,877 B2 | 2/2008 | Crodian et al. |
| 7,581,858 B1 | 9/2009 | Gallegos |
| 7,993,042 B2 | 8/2011 | Padilla |
| 8,665,080 B2 | 3/2014 | Nagamine et al. |
| 8,796,529 B2 * | 8/2014 | Butera et al. ..................... 84/722 |
| 2003/0160688 A1 | 8/2003 | Kim et al. |
| 2008/0136617 A1* | 6/2008 | White et al. .................. 340/474 |
| 2008/0140240 A1* | 6/2008 | White et al. ..................... 700/94 |
| 2009/0167519 A1* | 7/2009 | Kracker et al. ............... 340/475 |
| 2012/0098656 A1* | 4/2012 | Ikeda ............................. 340/438 |
| 2013/0293105 A1 | 11/2013 | Day |
| 2014/0191860 A1* | 7/2014 | Akamine ....................... 340/474 |
| 2014/0268839 A1 | 9/2014 | Timmerberg |
| 2014/0354153 A1 | 12/2014 | Pulido |

* cited by examiner

Primary Examiner — Jeffrey Donels
(74) Attorney, Agent, or Firm — The Law Office of Joseph L. Felber

(57) ABSTRACT

A vehicle operator may activate turn signals without interfering with his/her enjoyment of ambient music. A turn signal system has a tempo extractor to determine the tempo of the ambient music and a trigger generator to transmit to a turn signal controller a trigger that causes the system's turn signaling mechanism to produce a repetitive sound that coincides with the ambient music. As the repetitive sound does not interfere with the vehicle operator's music enjoyment, the system increases diligence in the use of turn signals and thus increases safety of the vehicle operator and the safety of those proximate the vehicle operator who would be affected by a vehicle turn or lane change.

15 Claims, 6 Drawing Sheets

ADAPTING TURN SIGNAL

RELATED APPLICATION

This application claims benefit under 35 U.S.C. §119(e) of the Jan. 22, 2014 filing of U.S. Provisional Application No. 61/930,073, which is hereby incorporated by reference in its entirety.

BACKGROUND

An automobile's turn signals (sometimes called "turn indicators" or "blinkers") indicate the intention of a driver to turn or to change lanes. The turn signal's flash rate is generally constant, produced by a signal controller which sometimes comprises an oscillator prone to drift its frequency according to the automobile battery voltage. The oscillator triggers accordingly on/off a relay that switches power to the turn signal lights. Often the oscillator and the relay are implemented in the same unit called "signal flasher blinker relay." Accordingly, the flash rates tend to be within the range of 60 and 120 flashes per minute.

To remind a driver that his/her turn signals are operating, so as not to forget to turn them off after changing lanes, the repetitive sound of the relay is made audible to the driver. This sound can be the natural mechanical noise of a relay that switches the current to the turn signal electronics.

A problem frequently arises when a driver listens to music while operating turn signals: the loud sound of the turn signal interferes with the enjoyment of listening to the music, and this interference tends to quickly annoy the driver. Unfortunately, this annoyance can motivate some drivers to consciously decide not to activate turn signals, which detracts from the driver's safety and the safety of those proximate the driver.

It would be desirable if the sound of the blinker relay would not interfere with the music while still notifying the driver that the turn signal is on and needs to be turned off.

SUMMARY

The present inventors have determined a way to permit a vehicle operator to activate turn signals when appropriate without interfering with the enjoyment of ambient music. The invention may be embodied as a system or a method.

For example, the invention may be embodied as a turn signal system for a vehicle. The system has a tempo extractor and a trigger generator. The tempo extractor is operative to determine a tempo of ambient music. The trigger generator is operative to produce and to transmit to a turn signal controller a trigger having a frequency equal to the determined tempo multiplied by a constant. The turn signal controller is operative to generate a control signal to circuitry of a turn signaling mechanism that produces a repetitive sound having a frequency equal to the frequency of the trigger. In some implementations, the trigger generator adjusts the phase of the trigger so that the repetitive sound of the turn signaling mechanism is synchronized with the beat of the ambient music.

The invention may also be embodied as a method of adapting a turn signal system to ambient music, the turn signal system generating a repetitive sound to accompany repetitive visual indications. The method includes: determining a tempo of ambient music; and adjusting the frequency of a turn signal system's repetitive sound to be equal to the determined tempo multiplied by a constant. In some implementations, the method also includes: determining a phase of the ambient music; and adjusting the turn signal system's repetitive sound to be synchronized with the beat of the ambient music.

Embodiments of the present invention are described in detail below with reference to the accompanying drawings, which are briefly described as follows:

BRIEF DESCRIPTION OF THE DRAWINGS

The invention is described below in the appended claims, which are read in view of the accompanying description including the following drawings, wherein:

DETAILED DESCRIPTION

The invention summarized above and defined by the claims below will be better understood by referring to the present detailed description of embodiments of the invention. This description is not intended to limit the scope of claims but instead to provide examples of the invention. As discussed below, the invention may be embodied as a turn signal system for a vehicle and as a method of adapting a turn signal system to ambient music.

Figure 1:
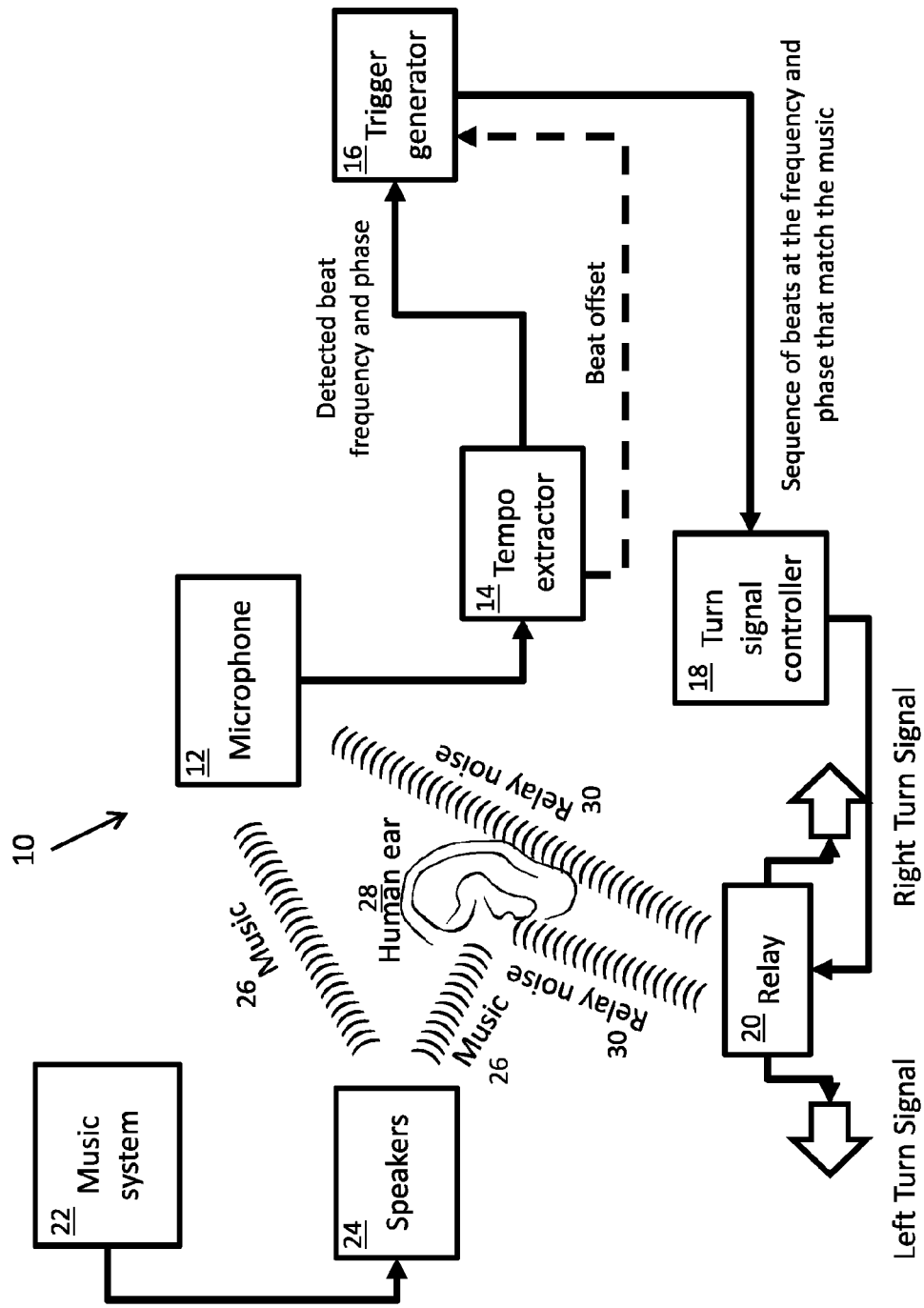
FIG. 1 illustrates a turn signal system in accordance with an embodiment of the invention.

FIG. 1 provides a diagram of the invention embodied as a turn signal system 10 for a vehicle. The turn signal system 10 includes a microphone 12, a tempo extractor 14, a trigger generator 16, a turn signal controller 18, and a relay 20 of a turn signaling mechanism. The vehicle also includes a music system 22 having speakers 24 that output music 26. A user of the embodiment, such as the vehicle's operator, illustrated in FIG. 1 as the human ear 28, hears both the music 26 and relay noise 30 from the relay 20.

The microphone 12 of the turn signal system 10 senses both the music 26 and relay noise 30, as the human ear 28 senses both sounds. The microphone 12 consequently outputs a signal based on the sounds to the tempo extractor 14. The tempo extractor 14 determines a beat frequency, that is, the tempo, of the ambient music and sends a signal indicative of the tempo to the trigger generator 16. In some implementations, the signal sent from the tempo extractor 14 also indicates the phase of the ambient music according to beat offset. For example, the tempo extractor 14 may be implemented to also determine the time, within a musical measure, where the music energy is at its peak, such as at the beat of a drum, and provides that time to the trigger generator 16 as an indication for the desired instance for triggering the relay. Extracting tempo and phase from ambient music is known in the art, and one example of a tempo extractor is discussed below with reference to FIG. 2.

With the signal sent from the tempo extractor 14, the trigger generator 16 produces and transmits to the turn signal controller 18 a trigger having a frequency equal to the determined tempo multiplied by a constant. If the tempo extractor 14 is implemented to also determine the time within a musical measure where the music energy is at its peak, as discussed in the preceding paragraph, the trigger also has a phase that matches the beat of the music within the measure. The constant may be set and reset according to the following consideration.

The turn signal controller 18 generates a control signal to the 20 relay to flash lights and to produce a repetitive sound having a frequency equal to the frequency of the trigger. This frequency should be near the frequency that a conventional turn signal flashes/clicks, such as between one and two hertz. However, the tempo of the music may have a frequency outside this range. Accordingly, the constant discussed in the previous paragraph may be set so that the product of the constant and the tempo is within the range that the conventional turn signal flashes/clicks. For example, the constant may be one, one half, two, a power of two, or the inverse of a value that provides on-beat or off-beat synchronization, as non-limiting examples. The term "off-beat" in the preceding sentence references a type of syncopation that emphasizes weak even beats of a measure as opposed to the usual on-beat syncopation.

It was stated above that in some implementations the signal sent from the tempo extractor 14 also indicates the phase of the ambient music according to beat offset. In such implementations, the trigger generator 16 adjusts the phase of the trigger so that the repetitive sound of the relay 20 of the turn signaling mechanism is in phase with the ambient music.

This turn signal system does not annoy a driver listening to music, and the sound of the signaling system synchronized as discussed can even be pleasing to the ear. Thus, there is not the annoyance of the prior art to motivate not to activate turn signals when appropriate. The present system therefore increases the driver's safety and the safety of those proximate the driver who would be affected by the driver's vehicle turn or lane change.

Figure 2:
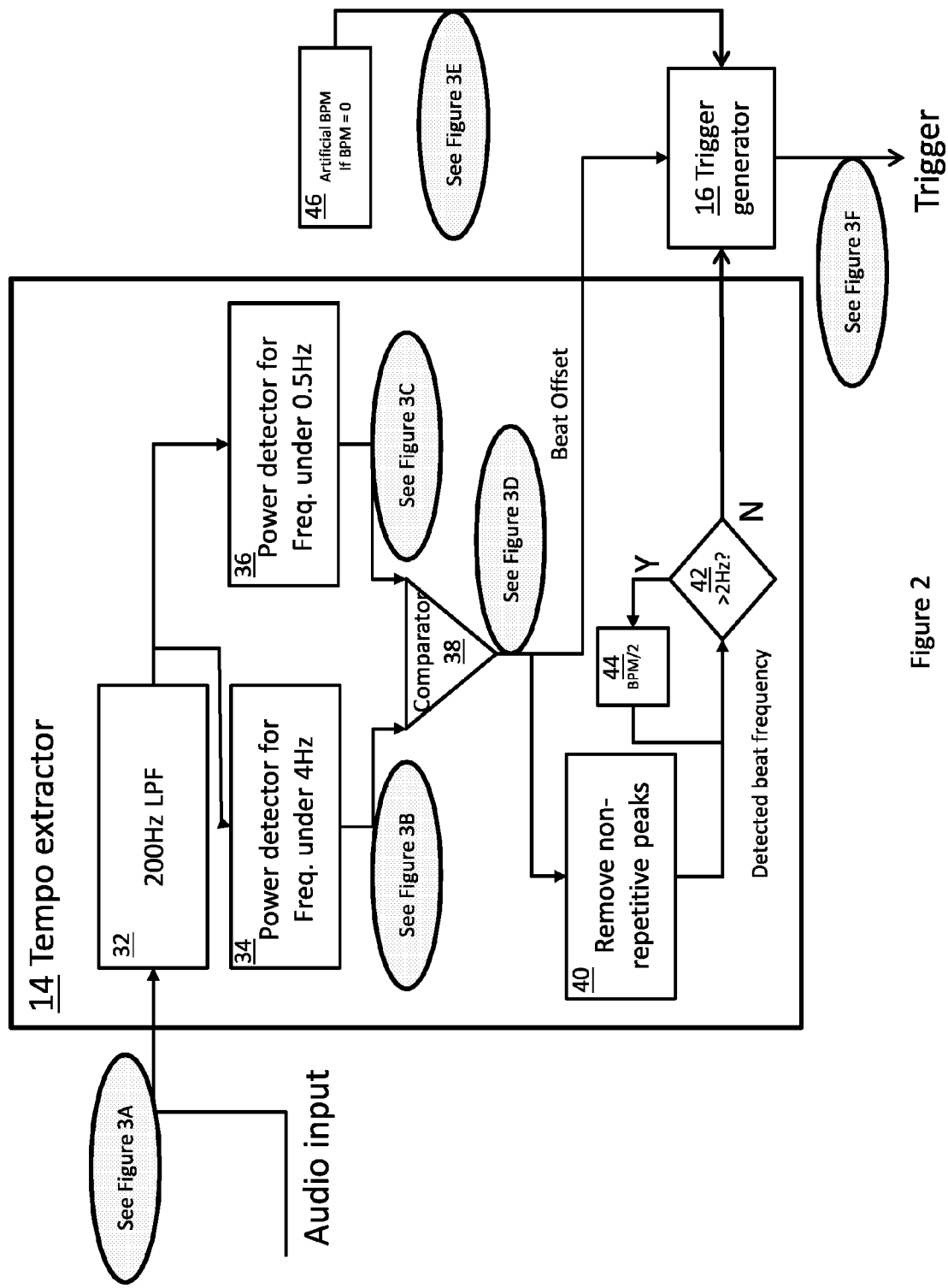
FIG. 2 provides a circuit diagram showing one way to construct a tempo extractor that may be used in the turn signal system illustrated in FIG. 1.
Figure 3:
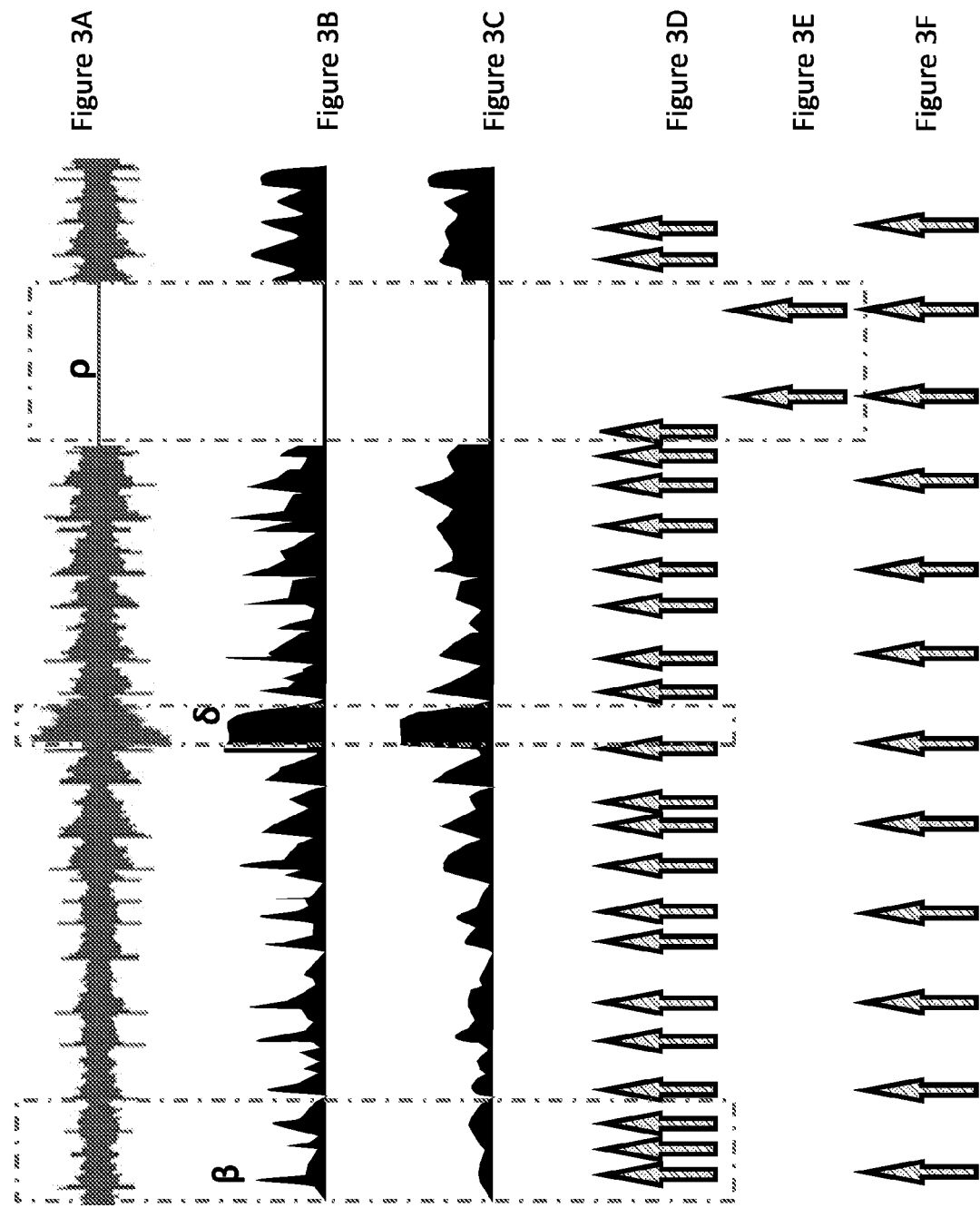
FIGS. 3A-3F illustrate waveforms at various points in the circuit of FIG. 2.
Figure 4:
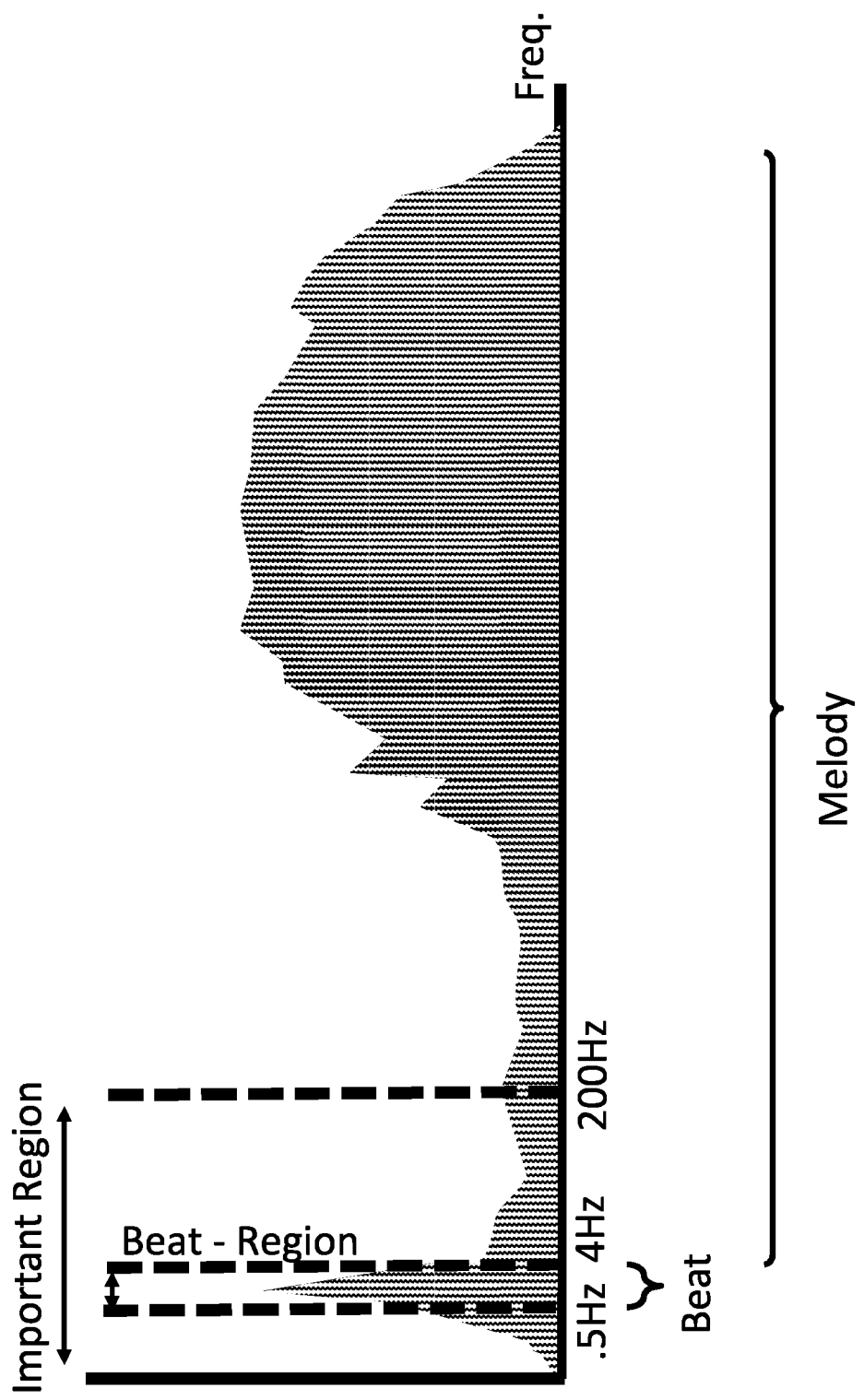
FIG. 4 provides an example full frequency spectrum of sounds typically sensed by the microphone of a turn signal system 12 of FIG. 1.

FIG. 2 provides a circuit diagram of one non-limiting way to construct a tempo extractor, and FIGS. 3A-3F illustrate waveforms at various points in the circuit. First, though, reference is made to FIG. 4 providing an example full frequency spectrum of sounds that the microphone 12 typically senses. For the present embodiment, the region of interest is the frequency range under 200 Hz., in particular the beat region between 0.5 and 4 Hz. Accordingly, the tempo extractor focuses on that region, as explained in the following:

As discussed above, audio output from the system microphone 12 becomes audio input to the tempo extractor 14. The audio input passes through a low pass filter 32. FIG. 3A illustrates the waveform (voltage/time) of the audio input to the low pass filter 32. In this example, the frequency that passes the filter 32 is under 200 Hz, but other values may be set and still remain within the spirit and scope of the invention.

The output of the low pass filter 32 is sent to power detectors 34 and 36. The power detector 34 indicates the power associated with the ambient music's frequency spectrum below 4 Hz., and the power detector 36 indicates the power associated with the frequency spectrum below 0.5 Hz. FIG. 3B illustrates the waveform of the output of the power detector 34, and FIG. 3C illustrates the waveform of the output of the power detector 36.

Figure 5:
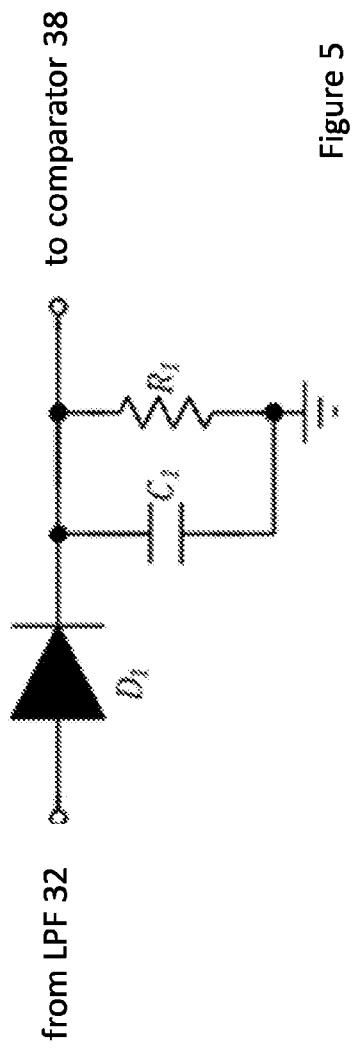
FIG. 5 provides a circuit diagram of an example power detector suitable for use in the tempo extractor of FIG. 2.

An example power detector, sometimes referred to as an "envelope detector," is shown in the circuit diagram of FIG. 5, which is a diode $D_1$ in series with a capacitor $C_1$ and a resistor $R_1$ in parallel. To create the waveforms of FIGS. 3B and 3C, the resistance of resistor $R_1$ and the capacitance of capacitor $C_1$ are set according to the following formula:

$$R_1 \times C_1 = 1/f$$

where f=4 Hz. for the power detector 34, and f=0.5 Hz. for the power detector 36.

The output of the power detectors 34 and 36 is sent to a comparator 38 (functioning as a XOR gate). The output waveform of the comparator 38 is illustrated in FIG. 3D. As is apparent, within the time span denoted by region β, there are three energy peaks in the waveforms of FIG. 3B (from the power detector 34) and two energy peaks in the waveform of FIG. 3C (from the power detector 36), but the waveforms are from the two power detectors 34 and 36 are almost indistinguishable. The steepest peaks in the FIG. 3B waveform coincide with the beat spike and ambient energy spikes shown in FIG. 3D.

A study of region δ in FIGS. 3B-3D shows that simplistic peak detection, that is, using only one power detector, may determine tempo improperly. For example, if the volume of the music sensed by the microphone 12 increases at lower frequencies that are lower than the tempo, both power detectors 34 and 36 will show peaks. The output of comparator 38 though does not produce a peak during that time span.

As shown in FIG. 3D, the signal from the comparator 38 has both repetitive and non-repetitive peaks, so it cannot yet be sent to the trigger generator 16. Instead, the signal is sent to circuitry 40 to remove the non-repetitive peaks, such circuitry being well-known in the art. The output of the circuitry 40 is sent to be checked at 42 whether frequency of the repetitive peaks is greater than 2 Hz. If it is, that frequency is divided in half and then checked again at 42. When the frequency is finally below 2 Hz., the signal is sent to the trigger generator 16. If the tempo extractor 14 is implemented to adjust the phase of the turn signal system's repetitive sound to be in phase with the ambient music, the "unprocessed" output from the comparator 38 is also sent to the trigger generator 16 to provide beat offset.

The trigger generator 16 acts as an AND gate having the repetitive signal and the beat offset as inputs. However, as shown in the waveforms at time region ρ. 3D, a temporary absence of music, such as can happen when a vehicles enters a tunnel, can cause an absence of peaks for the trigger generator 16. Accordingly, circuitry 46 is implemented to provide peaks for such circumstances, and illustrated in FIG. 3E. Then, the output of the trigger generator 16 for the turn signal controller 18 is a series of continuous and repetitive peaks, as shown in FIG. 3F.

Figure 6:
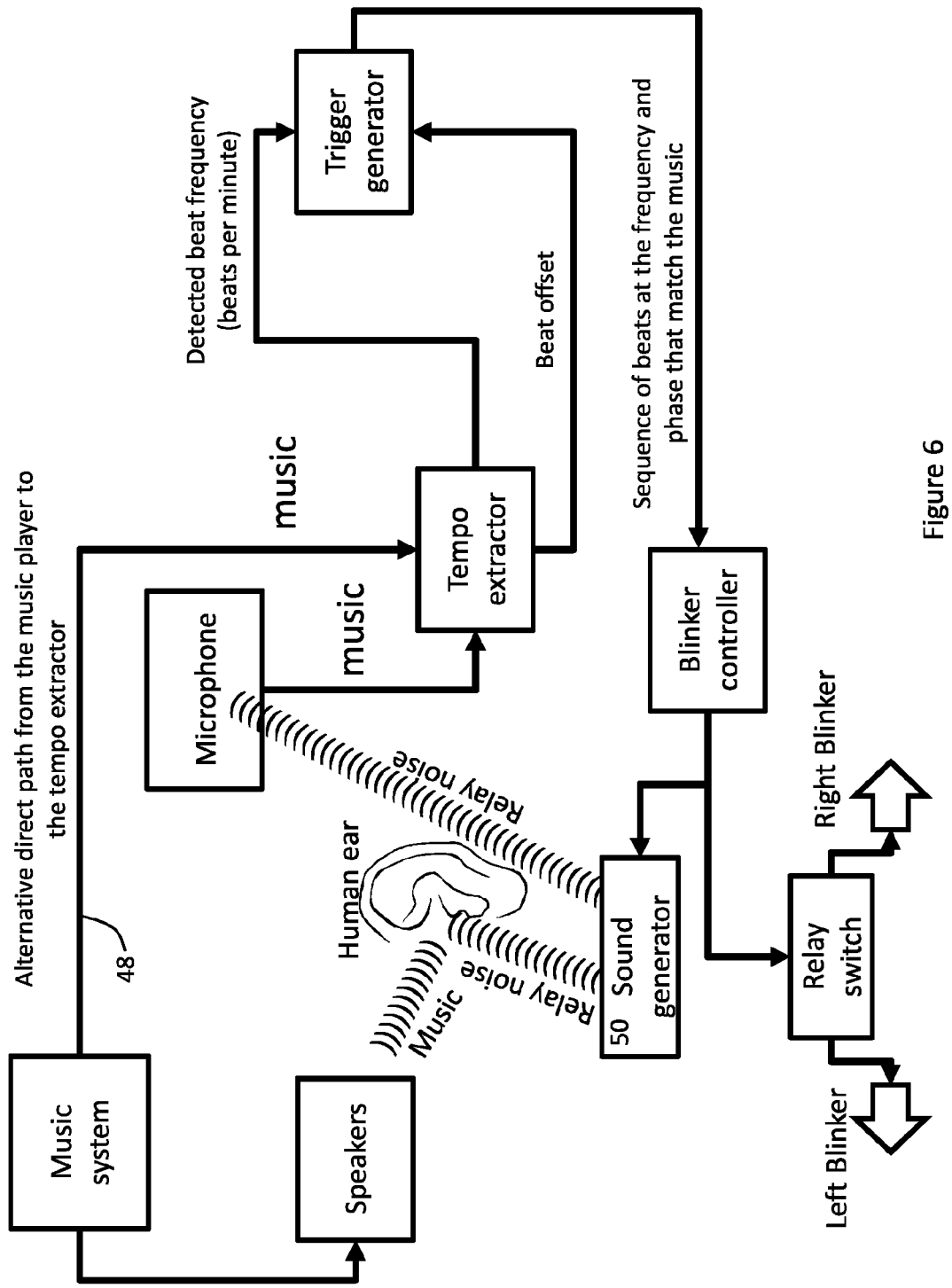
FIG. 6 illustrates a turn signal system in accordance with an alternate embodiment of the invention.

Reference is made to FIG. 6, presenting alternate embodiments of the invention. For example, the tempo extractor does not need to rely on a microphone to receive audio input corresponding to the ambient music. Instead, the music signal corresponding to the ambient music may be sent to the tempo extractor through a wired connection 48 without relying on a microphone. In other embodiments, the music signal corresponding to the ambient music may be sent to the tempo extractor through via a Bluetooth or other wireless link. In still further embodiments, the turn signal system may access tempo information of the ambient music from a remote server and then send input to the trigger generator. In another embodiment, instead of relying on a relay to produce sound, the turn signal system includes a separate sound generator 50 to produce the turn signal sound that the driver hears.

Figure 7:
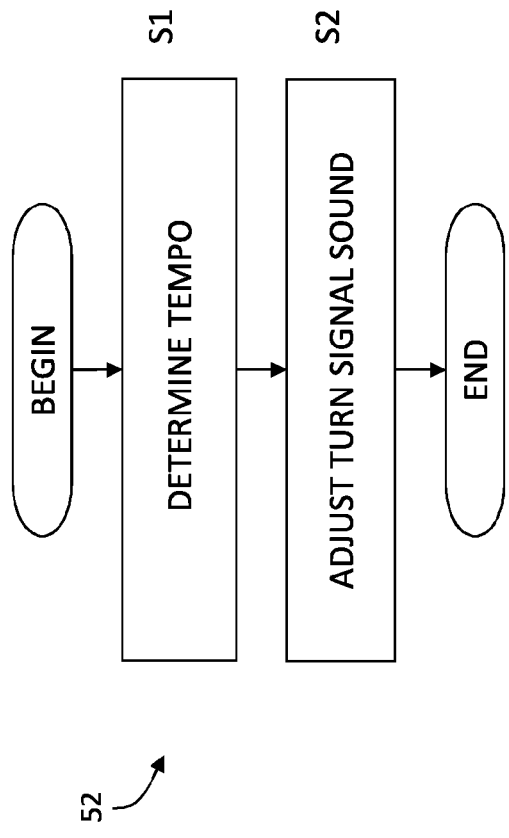
FIG. 7 provides a flow chart representing a method of adapting a turn signal system to ambient music in accordance with another embodiment of the invention.

FIG. 7 provides a flow chart 52, which illustrates the invention embodied as a method of adapting a turn signal system to ambient music. Analogous to the embodiments above, the turn signal system to which this method is applied generates a repetitive sound to accompany repetitive visual indications.

The first step of this method is to determine the tempo of the ambient music. (Step S1.) As a non-limiting example, the tempo extractor of FIG. 2 may be implemented. Also, in some implementations, the phase of the ambient music is also determined.

The next step of the method is to adjust the frequency of the turn signal system's repetitive sound to be equal to the determined tempo multiplied by a constant. (Step S1.) The constant may be set to be one, one half, or two, for example, so that the product of this constant and the tempo is within the range of desired turn signal flash/click frequency. In the implementations in which the phase of the ambient music is also determined, the turn signal system's repetitive sound is adjusted also to be in phase with the ambient music.

Having thus described exemplary embodiments of the invention, it will be apparent that various alterations, modifications, and improvements will readily occur to those skilled in the art. Alternations, modifications, and improvements of the disclosed invention, although not expressly described above, are nonetheless intended and implied to be within spirit and scope of the invention. For example, instead of embodying the invention for use with a relay, such as the relay 20 in FIG. 1, other circuitry producing a repetitive sound may be used. As another example, the system/method may be modified so that, if the turn signal remains on for more than a preset amount of time (perhaps because the driver forgot to turn off the turn signal when appropriate), the frequency of the audible signal changes to become easier to perceive consciously (that is, it becomes annoying). Still another example modification is the system/method causing a change in frequency and/or phase of the turn signal's sound in response to a burnt-out light. Accordingly, the foregoing discussion is intended to be illustrative only; the invention is limited and defined only by the following claims and equivalents thereto.

We claim:

1. A turn signal system for a vehicle, the system comprising:
   a tempo extractor operative to determine a tempo of ambient music; and
   a trigger generator operative to produce and to transmit to a turn signal controller a trigger having a frequency equal to the determined tempo multiplied by a constant;
   wherein the turn signal controller is operative to generate a control signal to circuitry of a turn signaling mechanism that produces a repetitive sound having a frequency equal to the frequency of the trigger.

2. The system of claim 1, wherein the trigger generator adjusts the phase of the trigger so that the repetitive sound of the turn signaling mechanism is synchronized with the beat of the ambient music.

3. The system of claim 1, wherein the circuitry includes a relay operative to receive the control signal from the turn signal controller to produce the repetitive sound.

4. The system of claim 1 further comprising:
   a microphone operative to sense the ambient music;
   wherein the microphone provides input to the tempo extractor based on the ambient music.

5. The system of claim 1, wherein a music signal corresponding to the ambient music is sent to the tempo extractor without relying on a microphone.

6. The system of claim 5, wherein the music signal corresponding to the ambient music is sent to the tempo extractor through a wired connection.

7. The system of claim 5, wherein the music signal corresponding to the ambient music is sent to the tempo extractor through a wireless connection.

8. The system of claim 1, wherein the constant is one.

9. The system of claim 1, wherein the constant is one half.

10. The system of claim 1, wherein the constant is two.

11. A method of adapting a turn signal system to ambient music, the turn signal system generating a repetitive sound to accompany repetitive visual indications, the method comprising:
    determining a tempo of ambient music; and
    adjusting the frequency of a turn signal system's repetitive sound to be equal to the determined tempo multiplied by a constant.

12. The method of claim 11 further comprising:
    determining a phase of the ambient music; and
    adjusting the turn signal system's repetitive sound to be synchronized with the beat of the ambient music.

13. The method of claim 11, wherein the constant is one.

14. The method of claim 11, wherein the constant is one half.

15. The method of claim 11, wherein the constant is two.

* * * * *